3,182,085
PRODUCTS PREPARED FROM THE REACTION OF HALOMETHYLATED DIPHENYL OXIDE AND AMINES
Lehi L. Pitchforth, Jr., Midland, Mich., assignor to The Dow Chemical Company, Midland, Mich., a corporation of Delaware
No Drawing. Filed Mar. 29, 1961, Ser. No. 99,075
6 Claims. (Cl. 260—570.9)

This invention relates to certain reaction products of halomethylated diphenyl oxides and amines and, more particularly, to novel compositions having the general formula:

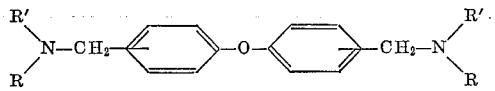

wherein R is a substituent selected from the group consisting of hydrogen, alkyls having from one to ten carbon atoms, hydroxyalkyls having two to six carbon atoms and cyclic alkyls having from five to six carbon atoms, R' is a substituent selected from the group consisting of phenyl, alkyls having from one to ten carbon atoms, hydroxyalkyls having from two to six carbon atoms and cyclic alkyls having from five to six carbon atoms and herein R and R' taken together form with the nitrogen atom a ring containing four to five carbon atoms.

The above compositions may readily be prepared by slowly contacting diphenyl oxides, having two halomethyl groups attached thereto with amines having the formula:

(wherein R and R' are as defined above) at a temperature from about 20° C. to about 150° C. and a contact time ranging from nearly instantaneous to about four hours, depending upon the reaction temperature and the relative proportion of reactants utilized.

Although the reaction is exothermic, control of the reaction temperature may be achieved by the rate of the addition of reactants and the amount of heating or cooling applied to the reaction mixture. Inert solvents such as liquid aromatic hydrocarbons may be employed to moderate the reaction and to facilitate contact of reactants. Agitation is normally employed to insure efficient contact of the reactants. In general, it is desirable to add the halomethylated diphenyl oxide portionwise to the amines to assure the presence of an excess of amines in the reaction mixture.

After the reaction is essentially complete, the reaction mixture is desirably treated with an alkaline material such as sodium and potassium carbonates and hydroxides or the like to react with the acid by-product formed; thereafter, the reaction mixture is subjected to distillation and washing, filtering, and/or decantation to effect removal of unreacted amines, and impurities.

The type of reaction product obtained is somewhat governed by the proportions of halomethylated diphenyl oxide, preferably chloromethyl diphenyl oxide or bromomethyl diphenyl oxide, and amine utilized. It has been found that a proportion of less than about three and one half moles of amine to each halogen equivalent of said halomethylated diphenyl oxide sometimes provides a reaction product that possesses a relatively long chain or cross-linked formation and high proportion of halomethylated diphenyl oxide moiety contained therein; whereas it has been found that a proportion of about three and one half moles of amine and preferably about five moles or more of amine to each halogen equivalent of said halomethylated diphenyl oxide provides a reaction product characterized by uniform or more uniform substitution of the halogen substituents contained in the halomethylated diphenyl oxide.

Reaction products that may be formed as described above, for example:

2,2',2",2"'-(oxybis(p-phenylenemethylenenitrilo)) tetraethanol;
2,2'-(oxybis(p-phenylenemethyleneimino)) diethanol;
N,N'-oxybis(p-phenylenemethylene) bis(butylamine);
N,N'-oxybis(p-phenylenemethylene)bis(dibutylamine);
N,N'-(oxybis(p-phenylenemethylene)) dianiline;
1,1'-(oxybis(p-phenylenemethylene)dipiperidine;
N,N'-oxybis(p-phenylenemethylene) bis(cyclohexylamine);
N,N'-oxybis(p-phenylenemethylene)bis(dicyclohexylamine);
2,2'-oxybis(p-phenylenemethylene(ethylimino))diethanol;
2,2'-oxybis(p-phenylenemethylene(cyclohexylimino)) diethanol;
1,1'-oxybis(p-phenylenemethylene(cyclohexylimino))di-2-propanol;
2,2'-oxybis(p-phenylenemethylene(phenylimino))diethanol;
1,1'-oxybis(p-phenylenemethylene(phenylimino))di-2-propanol;
N,N'-oxybis(p-phenylenemethylene)bis(octylamine);
N,N'-oxybis(p-phenylenemethylene)bis(nonylamine);
N,N'-oxybis(p-phenylenemethylene)bis(decylamine);

and the like are highly useful as column agents for vapor phase chromatography in both packed column and capillary techniques due to their solubility properties and thermal stability as well as relatively high boiling characteristics.

The following examples are given to illustrate the products that may be prepared in accordance with the present invention as well as to display utility of said reaction products, but are not to be construed as limiting the invention thereto.

EXAMPLE 1
Preparation of 2,2'2",2"'-(oxybis(p-phenylenemethylenenitrilo)) tetraethanol A two-liter, three-necked flask was equipped with a funnel, mechanical stirrer and a heating mantle. The flask was charged with 1241 grams (11.8 moles) of diethanolamine. Five hundred grams (1.87 moles) of bis-(α-chloro-p-tolyl) ether were added portionwise to the flask with agitation over a period of two hours with said flask maintained at a temperature between about 25° C. to about 113° C. The reaction proceeded exothermically with temperature rising from 69° to 117° C. without further heating. To insure completion of the reaction, the reaction mixture, while being agitated, was maintained at a temperature of 107° C. to 114° C. for four more hours. After cooling, sufficient fifteen percent aqueous sodium carbonate solution was introduced to neutralize the acid by-product. The flask was then cooled to room temperature and the organic layer was separated from the aqueous layer and thereafter subjected to distillation under reduced pressure to separate the unreacted diethanolamine and water from the product, 2,2',2",2"'-(oxybis(p-phenylenemethylenenitrilo)) tetraethanol, a light brown viscous liquid having a boiling point of >215° C./2.0 mm. and a refractive index (n./D) of 1.573 at 25° C.

EXAMPLE 2

Following a procedure similar to the foregoing, various other reaction products of bis(α-chloro-p-tolyl) ether and amines, such as ethanolamine, butylamine, dibutylamine, aniline, piperidine, cyclohexylamine, dicyclohexylamine, ethylethanolamine and N-methylaniline were prepared;

the physical properties of representative reaction products are as follows:

| Amine reactant | Product obtained | Physical characteristics | Refractive index (n/D) at 25° C. | Boiling point at indicated pressure | Melting point, °C. |
|---|---|---|---|---|---|
| Ethanolamine | 2,2'-(oxybis(p-phenylenemethyleneimino)) diethanol. | Light-colored solid | | | 64.5–66.5 |
| Butylamine | N,N'-oxybis(p-phenylenemethylene)bis (butylamine). | Light tan, clear liquid | 1.5414 | >180° C./6 mm | |
| Dibutylamine | N,N'-oxybis(p-phenylenemethylene)bis (dibutylamine). | Light tan liquid | 1.5149 | >190° C./5 mm | |
| Aniline | N,N'-(oxybis(p-phenylenemethylene)) dianiline. | Light-colored solid | | | 112–117 |
| Piperidine | 1,1'-(oxybis(p-phenylenemethylene)) dipiperidine. | ___do___ | | | 53–55 |
| Dicyclohexylamine | N,N'-(oxybis(p-phenylenemethylene))bis (dicyclohexylamine). | Brown syrup | | | |
| Ethylethanolamine | 2,2'-(oxybis(p-phenylenemethylene(ethylimino)))diethanol. | Light straw-colored viscous liquid. | 1.5576 | >215° C./3 mm | |
| N-methylaniline | N,N'-oxybis(p-phenylenemethylene)bis (N-methylaniline). | Brown syrup | 1.6453 | >194° C./3 mm | |

The symbol ">" indicates that the compounds were of such low volatility as not to distill under the indicated conditions.

EXAMPLE 3

To demonstrate the utility of the subject reaction products, 0.01 milliliter of a mixture of propylene glycol and ethylene glycol are vaporized and carried by a stream of helium at the rate of 50 cubic centimeters per minute and at the temperature of 110° C. through a copper gaseous phase chromatography column, ten feet high with a ¼" outside diameter, packed with 36–60 mesh diatomaceous earth having 40 percent by weight of 2,2',2",2'''-(oxybis(p - phenylenemethylenenitrilo)) tetraethanol impregnated therein. To determine and record the results obtained, the effluent gas from said column was passed through a thermoconductivity cell operating at a filament current of 150 milliamperes and equipped with a 0–10 millivolt recording potentiometer recording at the rate of 8 inches per hour in the manner reported at pp. 111–140 of "proceedings, 1959, Second Bi-annual International Gas Chromotography Symposium." Separation of said mixture was effected in a manner superior to that attainable by known partitioning agents.

In a manner similar to the foregoing Example 3, other mixtures containing glycols were partitioned with the reaction products described and claimed herein. Such partitioning was highly successful with both packed column and capillary techniques.

Various modifications may be made in the present invention without departing from the spirit and scope thereof and it is to be understood that I limit myself only as defined in the appended claims.

I claim:
1. 2,2',2",2'''-(oxybis(p - phenylenemethylenenitrilo)) tetraethanol.
2. 2,2'-(oxybis(p - phenylenemethyleneimino))diethanol.
3. N,N'-(oxybis(p-phenylenemethylene))dianiline.
4. N,N'-(oxybis(p - phenylenemethylene))bis(dicyclohexylamine).
5. 2,2' - (oxybis(p-phenylenemethylene(ethylimino))) diethanol.
6. N,N' - oxybis(p-phenylenemethylene)bis(N-methylaniline).

References Cited in the file of this patent
UNITED STATES PATENTS

| 2,441,576 | Jones et al. | May 18, 1948 |
| 2,962,531 | Coffield | Nov. 29, 1960 |

FOREIGN PATENTS

| 651,433 | Great Britain | Apr. 4, 1951 |
| 651,445 | Great Britain | Apr. 4, 1951 |

OTHER REFERENCES

Tomita et al.: Journal of the Pharmaceutical Society of Japan, vol. 73: page 760.